United States Patent Office 2,990,750
Patented July 4, 1961

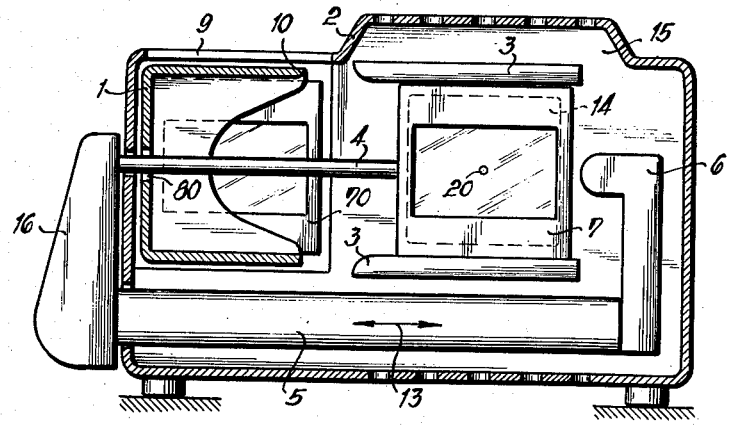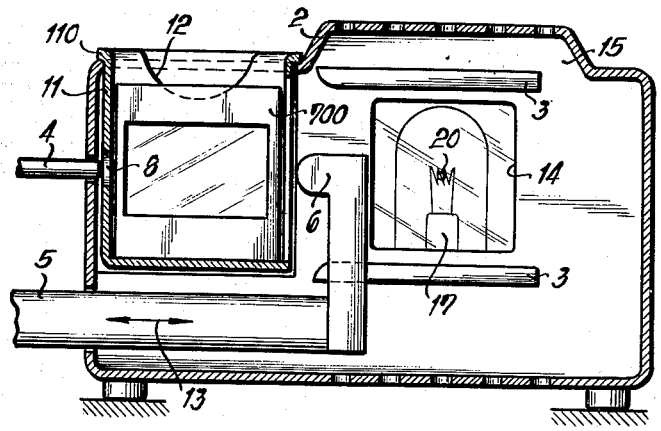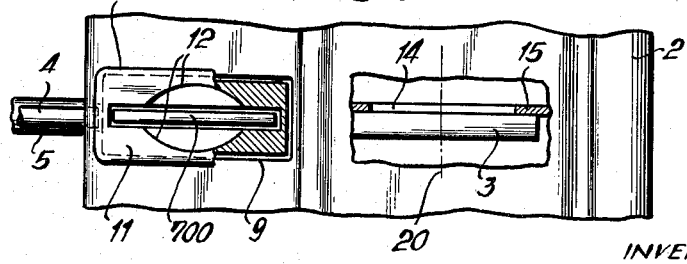

2,990,750
APPARATUS FOR PROJECTING INDIVIDUAL SLIDES IN PROJECTORS WITH A MULTIPLE SLIDE MAGAZINE
Erich Zillmer, Braunschweig, Germany, assignor to Voigtlander A.G., Braunschweig, Germany, a corporation of Germany
Filed Mar. 3, 1960, Ser. No. 12,545
Claims priority, application Germany Mar. 5, 1959
4 Claims. (Cl. 88—28)

This invention relates to slide projectors of the type having a multiple slide magazine which is advanced one step each time a slide therein has been exhibited and returned to the magazine, and more particularly to an improved attachment and construction for such projectors by means of which an individual or single slide may be exhibited without manipulation or advance of the magazine.

In known slide projectors having a multiple slide magazine and a slide changing device operated by hand or mechanically, and in which the slide is advanced by one step each time the slide changing device is operated, in order to project an individual slide, the latter must be placed in the magazine and the magazine then must be operated until the selected individual slide has been advanced to the plane of projection. Subsequently, further operation of the slide changing device is required to advance the magazine to a position in which the individual picture is freely accessible for removal from the magazine.

In accordance with the present invention, means are provided, in such a slide projector, for exhibiting a single selected slide without the aforementioned complicated and time consuming manipulation of the magazine through operation of the slide changer. More particularly, a novel holder for a single individual slide is provided, and a wall, preferably the top wall, of the projector is provided with a slot, substantially co-planar with the plane of slide projection, arranged to receive this holder with the slide therein. The holder is further formed for cooperation with the slide changer, and with means properly positioning it in correct relation with the projection plane.

For an understanding of the invention principles, reference is made to the following description of a typical embodiment thereof as illustrated in the accompanying drawing.

In the drawing:

FIG. 1 is a vertical sectional view, at right angles to the optical axis, of a magazine type slide projector modified in accordance with the present invention and showing a magazine mounted therein;

FIG. 2 is a view similar to FIG. 1 showing the individual picture holder of the present invention mounted in the projector; and FIG. 3 is a part plan view, partially in section, corresponding to FIG. 2.

Referring to the drawings, FIG. 1 shows a projector casing 2 in which is mounted a multiple slide magazine 1 arranged to hold, for example, 36 slides denoted 7, 70. Magazine 1 is mounted for longitudinal displacement in a direction parallel to the optical axis 20 of projector 2. In a known manner, the magazine 1 is open on its side facing optical axis 20 and its opposite side is provided with an opening 80, through which an arm 4 of a slide changing device, or slide changer 5 can enter the magazine. The slide changer 5, which is displaceable in the direction of the double arrow 13, is shown (in FIG. 1) in the end position in which its arm 4 has passed through magazine 1 and has thereby moved slide 7, which is located in its range, to the projecting position aligned with optical axis 20 in such movement. Slide 7 moves along guides 3, which are fastened on a wall 15 formed with a window 14 of projector casing 2.

In FIG. 2, the projection lamp, which is visible in window 14, is denoted 17. When slide changer 5 is gripped at its handle 16 and moved to the left in the drawing, its arm 6 engages picture 7 and moves it back into magazine 1. When, shortly before the end of the movement of the slide changer, arm 4 emerges from magazine 1, in a known manner and by the action of a device not shown, magazine 1 is displaced longitudinally by one frame or picture gauge in a direction parallel to the optical axis 20. At the next operating movement of slide changer 5 to the position shown in FIG. 1, arm 4 of the slide engages picture 70, which is then aligned with the slide changer, and moves it to the projecting position. The construction of projector 2, and its operation, as so far described, are known and constitute no part of the present invention.

In accordance with the invention, at that point of the top wall of projector casing 2 at which the lines of motion of magazine 1 and slide changer 5 intersect each other, a slot 9 is provided. Slot 9 extends longitudinally of the line of movement of slide changer 5, and is transversely centered on this line of movement. The slide is longitudinally centered on the line of movement of magazine 1. The slot has lateral and longitudinal dimensions such as to conformingly receive the single or individual slide holder 11, as shown in FIGS. 2 and 3. This holder 11 can be inserted through slot 9 into the projector, into the position shown in FIG. 2, when magazine 1 has been either removed from the projector or sufficiently retracted so as to provide for movement of holder 11 into the projector. Slide holder 11 has a flange 110 at its upper end, which serves to support the slide holder on the marginal portions of the top wall of the projector defining the slot 9. Holder 11, in the same manner as is magazine 1, has its side toward the optical axis 20 open, and its opposite side has an opening 8 for the arm 4 of slide changer 5.

In effect, holder 11 is an individual part of compartment of a conventional magazine, separated from such magazine. Thus, slide changer 5 may be operated, in the same manner as it is operated with respect to magazine 1, to move the individual slide 700 located in holder 11 out of the holder and into the projecting position, and then to move this individual slide from the projecting position back into the holder. The slide holder 11 may therefore be used whether the slide changer 5 is moved manually, as in the embodiment shown, or mechanically or automatically as is usual in some types of slide projectors.

By the modification of the projector casing to provide the slot 9, and the use of the individual slide holder 11 inserted through this slot, there is no longer required any extensive manipulation of magazine 1 in order to position a selected individual slide in the projection plane. It is merely necessary to remove the magazine 1 from the projector, or to retract it a pre-determined amount, so that the slide holder 11, with the selected individual slide 700 therein, can be dropped into the slot 9 and removed therefrom readily after the individual slide has been exhibited.

The single slide 700 in the holder 11 can be easily exchanged, if desired, without removing the holder 11 from the projector casing 2. For this purpose, the slide holder 11 may be provided with recesses or cutouts 12 on either side of the slot in the holder receiving the individual slide.

When the projector is to be used with magazine 1, rather than with the individual holder 11, the slot 9 can be closed by a cover or slide, or it can be left open so that numbering or lettering on the upper wall of the magazine will be visible through the slot.

While a specific embodiment of the invention has been shown and described in detail in order to illustrate the application of the invention principles, it will be understood that the invention may be embodied otherwise without departing from such principles.

What is claimed is:

1. In a slide projector of the type having a multiple slide magazine mounted therein for movement parallel to the optical axis of the projector and having an open longitudinal side toward the optical axis, a slide changer movably mounted in the projector for reciprocation at right angles to the direction of magazine movement and having elements enterable through openings of the magazine to engage a slide therein for movement of the slide through the open side of the magazine to the projection position and return to the magazine, and mechanism operable, responsive to the completion of each cycle of operation of the slide changer, to advance the magazine to position a succeeding slide in the plane of movement of the slide changer: means for selectively projecting an individual slide at will and without the necessity of manipulation of the slide changer to advance the magazine to position such selected slide in the plane of movement of the slide changer, said means comprising a relatively elongated slot in a wall of the projector casing and extending along the line of movement of the slide changer and centered transversely of said line of movement, said slot being centered longitudinally on the line of movement of the magazine; and an individual slide holder having a conforming fit in said slot to project into the path of movement of the slide changer when the magazine is retracted longitudinally to clear said slot; said holder having an outwardly opening slide receiving slot positioned in the plane of movement of the slide changer when the holder is in said first-mentioned slot; said holder being restrained by said first-mentioned slot from lateral movement relative to the optical axis and being opened toward the latter, and said holder further being formed for cooperation with the elements of the slide changer to engage a slide in said holder for movement of the slide out of the holder to the projection position and return into the holder.

2. Means as claimed in claim 1 in which said slot is formed in the top wall of the projector casing.

3. Means as claimed in claim 2 in which said holder has a peripheral flange on its upper edge engaging the top wall of the casing of the projector to position said holder properly in the projector.

4. Means as claimed in claim 1 in which said holder has a substantial thickness along the line of movement of said magazine, and its top surface is formed with recesses on either side of the slide receiving slot therein so that the selected slide in the holder may be readily interchanged with other selected slides.

References Cited in the file of this patent

UNITED STATES PATENTS

| | | |
|---|---|---|
| 2,878,604 | Mulch | Mar. 24, 1959 |
| 2,878,719 | Lutes | Mar. 24, 1959 |
| 2,895,242 | Wiklund | July 21, 1959 |